United States Patent Office 3,270,858
Patented Sept. 6, 1966

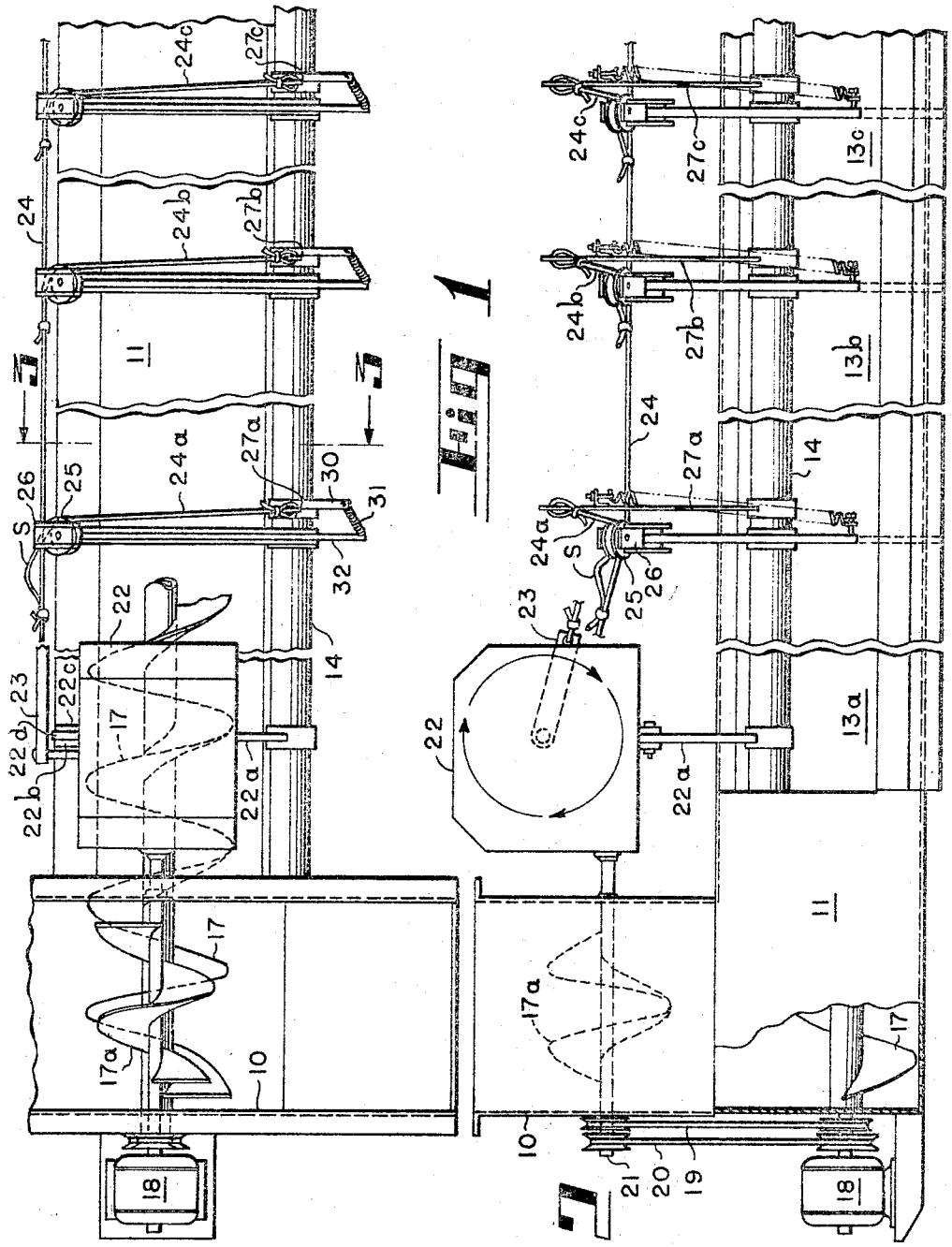

3,270,858
LATE OPENING, EARLY CLOSING GATE
MECHANISM FOR BUNK FEEDER
Victor C. Fuhrwerk, Celina, and Paul A. Luthman, Maria Stein, Ohio, assignors to Avco Corporation, Coldwater, Ohio, a corporation of Delaware
Filed Aug. 31, 1964, Ser. No. 393,333
3 Claims. (Cl. 198—64)

This invention relates to bunk feeders and is particularly concerned with the selective deposit of feed in a feed bunk.

Devices for conveying feed along an extended series of stations or bunks and depositing approximately equal amounts of feed in each bunk for the purpose of feeding cattle therein are well known. These usually comprise a hopper to which is connected a trough extending along the entire length of the bunks. Within the trough is housed an auger conveyor which upon rotation conveys the feed from the hopper along the length of the trough. The trough is provided with discharge openings disposed along the feed bunk, which openings are closed by gates. When the gates are opened, the feed within the conveyor spills into the bunk, providing an appropriate amount of feed for the cattle which station themselves along the bunk.

Various devices have been used for the purpose of insuring that equal amounts of feed are distributed along the entire length of the bunk. Where the gates are used to open the trough to permit feed to spill out, the continued inflow of feed to the hopper will flow out the first door while it is open, causing a pile-up of feed at this point in the bunk. This particularly occurs when the doors are opened and closed several times in one feeding. This pile-up can cause interference and prevent the door from completely closing, resulting in leakage from the trough during subsequent feeding cycles. Also, when livestock do not clean up the feed in the trough in the pile-up area, the feed is subject to spoilage from one feeding to the next. To avoid this difficulty the operator must be present to redistribute the pile-up. Automatic mechanisms operated from a timer designed to partially open the first gate, to close it early in the time cycle, or to delay the opening until the entire trough has been filled, have been suggested, but such mechanisms are often complicated and expensive and do not always perform the desired function satisfactorily.

In accordance with the present invention, we have devised a means to alleviate the build-up of feed in the bunk in the area of the hopper. By opening the first gate late and closing it early relative to the opening and closing of the other doors, the amount of material that normally would be deposited or built up at the hopper is reduced by the reduced amount of time that the first door is open, and such material is distributed in the bunk more or less equally between the door opening near the hopper and the opening at the end of the first door, thus alleviating the build-up problem.

An object of the invention is thus to provide a bunk feeder mechanism by which a more uniform deposit of feed in a plurality of bunks is accomplished.

Another object is to provide a mechanism by which the gate of a conveyor trough adjacent the hopper is opened late and closed early during the cycling of the automatic control mechanism, and while the conveyor is operating to move feed along the trough.

A further object is to provide resilient means by which the gates of the conveyor trough are normally maintained closed.

A further object is to provide a closing mechanism with sufficient resiliency to accommodate foreign materials that may find their way beween the lips of the gate and the sides of the trough against which it closes.

A still further object is to provide a resilient means to exert a substantially uniform resilient pressure on the gates to keep them closed during all times the control mechanism is not actuated to open them.

A still further object is to provide a mechanism of the utmost simplicity which combines a minimum number of operating parts, is economical of manufacture, and reliable in use.

The novel features that are considered characteristic of the present invention are set forth in the appended claims; the invention itself, however, both as to its organization and method of operation, together with additional objects and advantages thereof, will be best understood from the following description of a specific embodiment when read in conjunction with the accompanying drawings, in which:

FIG. 1 is a plan view of a bunk feeder connected to a hopper with certain sections of the conveyor trough not necessary for the purpose of explanation being broken away;

FIG. 2 is a side view of the mechanism of FIG. 1;

Figure 3:
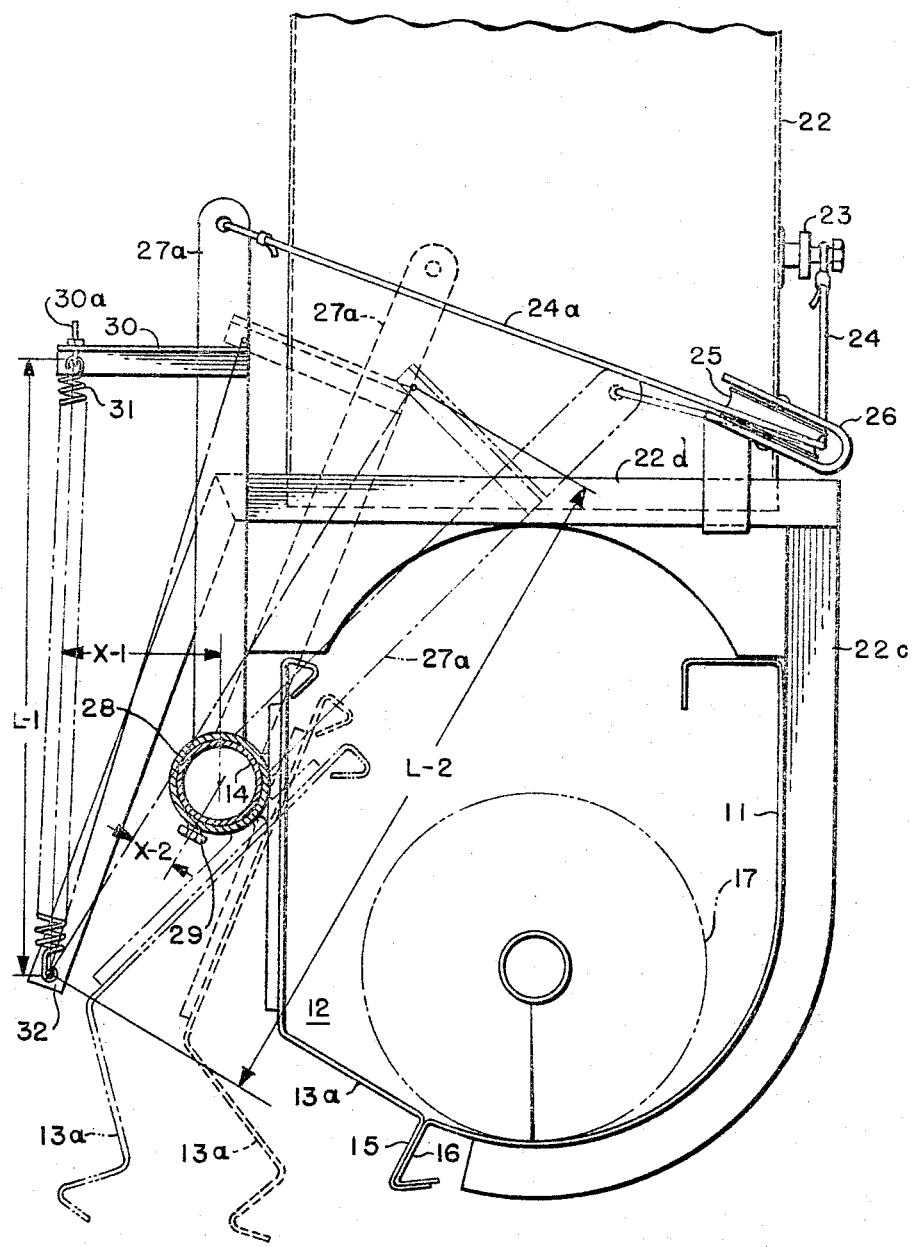
FIG. 3 is an end view, partially in section, of the mechanism showing the position of certain of the gates when the gate control means is actuated.

For the purpose of illustration and not limitation, the invention can be briefly described as comprising a trough through which feed is conveyed for selective deposit along an extended feed bunk, gates disposed along said trough, resilient means for holding said gates normally closed, means for opening said gates automatically, said means comprising a cyclically movable arm, cables connecting said arm with said gates whereby they are opened against the resilient holding means as the arm moves in its cycle, the cable connecting the first gate to said arm having a slack provided therein whereby the slack must be taken up before the cable which operates said first gate can actuate it.

Coming now to a detailed description of the drawings, the principal mechanisms comprise a hopper 10 connected to a trough 11 having an open side 12 which is closed by a series of gates 13a, 13b, and 13c, which gates are pivotally mounted on shaft 14. An auger 17 is disposed within the trough 11 and is rotated continuously by electric motor 18, the speed of which is suitably stepped down by a conventional belt and pulley arrangement 19, 20, which also drives shaft 21 connected to timing device 22. The timing device may be of any suitable construction by which the input is stepped down to effect a relatively slow rotation of crank 23 at timed intervals. Crank arm 23 is connected to cable system 24, hereinafter to be described, to actuate the gates 13a, 13b, and 13c at appropriate intervals.

A secondary auger 17a may be provided on shaft 21 within hopper 10 to agitate the feed prior to its deposit into the auger 17. The timer 22 is suitably supported in fixed relationship with the auger and hopper as by supports 22a and 22b, the former being fixedly secured to shaft 14 and the latter being secured to rear supports 22c, which likewise support the trough 11 at appropriate intervals along its length. Cross member 22d extends between these supports.

The cable arrangement connected to arm 23 will now be described. This comprises a main cable 24, to which are connected secondary cables 24a, 24b and 24c, which are run through pulleys 25 disposed in sheaves 26 and connected respectively to gate operating levers 27a, 27b and 27c which are integrally connected with gates 13a, 13b and 13c and pivoted on shaft 14. One of these levers is arranged to operate each of the gates by rotating them around pivot 14.

One of these gate operating arrangements will now be described, with particular reference to FIG. 3. In order to provide resilient means to hold the gates normally closed, an arm 30 is fixed to lever 27a and connected by tension spring 31 to a fixed arm 32 which is secured to the framework of the apparatus as by bolting or welding it to the cross arm 22d. An appropriate tension is provided on these springs by adjustment 30a.

It will be noted that the gates 13 are provided with lips 15 which cooperate with complementary lips 16 on the edges of the trough when the gates are closed. This makes it possible for the gate to close off the openings 12 even if particles of feed are lodged between the lips.

In order to provide for the late opening and early closing of the first gate, we simply provide slack S in the cable 24a which connects the arm 23 to the lever 27a operating the first gate. Thus when the timer causes the crank 23 to start its cycle, it pulls directly on cable 24 and starts to open gates 13b and 13c, the same being ultimately opened to the position shown in FIG. 3. When the slack in cable 24a is taken up, the first gate 13a likewise starts to open, but this occurs at a time later than the other gates start to open, such time depending upon the amount of slack provided. During the time the slack is being taken up, the gate is not open, resulting in feed run-out between the first and second gates. When the slack is taken up and during the time when the first door is opening and closing, the feed run-out is at the hopper end of the first door. This has the advantage of minimizing the pile-up of feed at the first bunk adjacent the first gate. During the time the arm 23 is cycling in the direction of the arrows noted in FIG. 2, and while the gates are opening, the springs 31 resist the opening force. A sufficient tension is provided so that the springs are still exerting tension at the time the gates are closed so that they will positively close as the arm 23 of timer 22 is completing its cycle and assumes the position shown in FIGS. 1 and 2.

While the tension on the springs tends to increase as the levers 27 are pulled to the right as shown in FIG. 3, the spring tension exerted on the gates is somewhat lessened in view of the fact that the spring pull is toward the axis 14 around which the gates pivot. This significantly reduces the pulling load required to open the gates. In this connection it will be noted that a substantial amount of spring force is required to hold the doors in a closed position while feed is being delivered down the length of the trough. With a normal tension spring system a force slightly greater than the spring force would be required to start opening the gate and, with the gate opening, the spring would be extended, adding to the required force to continue the opening of the door. With a multiplicity of doors and door-holding springs, the force to open all the doors against the increasing force of the springs could become substantial, requiring a substantial opening-effort-producing mechanism and a strong supporting structure. The arrangement of arms and springs of the disclosed system is such that the load required to open the gates to a position adequate to allow free flow of material from the trough, against the door-closing springs is not only substantially reduced but is very nearly maintained constant throughout the opening cycle. This is accomplished by arranging the spring pivot arm 32, door closing spring 31, door opening arm 27a, and spring anchor arm 30 about the gate pivot pipe 14, such that as arm 27a is pulled by cable 24a or other means to open the gate, spring 31 is pivoted toward the gate pivot pipe 14, thus reducing the torque arm from X–1 to X–2 (as noted in FIG. 3) while the spring 31 is extended from length L–1 to L–2 (as shown in FIG. 3).

It will be readily perceived that such additional gates as are desired can be provided to operate through the same arrangement of pulleys, cables, and spring-tension closures as that above described.

Having thus described our invention, we claim:

1. A cattle feeder comprising a longitudinally extending conveyor for conveying flowable feed along a series of adjacent coextensive feed bunks for depositing substantially equal amounts of feed in each bunk, said conveyor having a plurality of side gates mounted on longitudinally aligned pivots adjacent the sides thereof, a lever means for each gate fixed at one end to a respective one of said pivots, an arm extending approximately at right angles to said lever means, resilient means for each gate, each resilient means having an extensible longitudinal axis spaced from the axis of said pivots for maintaining each gate in normally closed position, each of said resilient means being connected to one end to a fixed point spaced from the axis of said pivots, the other end of each resilient means being connected to the end of a respective arm, whereby said resilient means is approximately parallel to said lever means, and means for independently actuating one of said lever means from the others of said lever means for opening said gates against the force exerted by said resilient means, said axes of said pivots and said resilient means approaching each other as each of said lever means is actuated to open said gates, said means for independently actuating one of said lever means from the other of said lever means including means for opening the first gate subsequent to the time the other gates are opened and closed prior to the time the other gates are closed.

2. The invention as defined in claim 1 wherein said resilient means is a spring.

3. The invention as defined in claim 1 wherein said means for actuating said levers includes cables connected to each of said levers, the cable connected to one of said levers having slack provided therein, whereby the slack must be takenup before the cable which actuates said lever is effective.

References Cited by the Examiner

UNITED STATES PATENTS

| 174,617 | 3/1876 | Caldwell | 198—205 X |
| 461,457 | 10/1891 | Terry | 222—70 |
| 2,074,130 | 3/1937 | Penley | 222—76 X |
| 2,246,354 | 6/1941 | Garlinghouse | 222—517 X |
| 2,409,994 | 10/1946 | Toohey | 198—205 X |
| 2,801,028 | 6/1957 | Ward et al. | 222—517 X |
| 2,806,583 | 9/1957 | Morris | 198—66 X |
| 2,827,921 | 3/1958 | Sherman et al. | 222—517 X |
| 2,962,194 | 11/1960 | Cotter | 222—517 X |
| 3,144,173 | 8/1964 | France et al. | 222—504 X |

FOREIGN PATENTS 480,274   6/1929   Germany.

EVON C. BLUNK, *Primary Examiner.*

HUGO O. SCHULZ, *Examiner.*

R. M. WALKER, M. L. AJEMAN, *Assistant Examiners.*